(12) United States Patent
Adair et al.

(10) Patent No.: US 7,953,727 B2
(45) Date of Patent: May 31, 2011

(54) HANDLING REQUESTS FOR DATA STORED IN DATABASE TABLES

(75) Inventors: Gregery G. Adair, Hendersen, NV (US); Brand Lee Hunt, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/098,360

(22) Filed: Apr. 4, 2008

(65) Prior Publication Data

US 2009/0254514 A1 Oct. 8, 2009

(51) Int. Cl.
*G06F 7/00* (2006.01)
*G06F 17/30* (2006.01)

(52) U.S. Cl. ....................................................... 707/715
(58) Field of Classification Search .................. None
See application file for complete search history.

(56) References Cited

OTHER PUBLICATIONS

Graefe et al., "Dynamic Query Evaluation Plans", ACM SIGMOD Record, vol. 18, Issue 2, pp. 358-366, 1989 ACM.*

* cited by examiner

*Primary Examiner* — Michael J Hicks
(74) *Attorney, Agent, or Firm* — Sawyer Law Group, P.C.

(57) ABSTRACT

Method for handling requests for data stored in database tables is provided. The method includes receiving a request for data stored in a database table, the database table including non-hash and hash columns, a hash column including hash values computed based on non-hash values in at least one non-hash column, generating database queries that are executable to retrieve data stored in the database table satisfying the request, each database query using a different combination of columns in the database table, ranking the database queries based on desirability, determining whether any of the database queries only uses indexed columns, responsive to one or more of the database queries only using indexed columns, selecting a highest ranked of the one or more database queries that only uses indexed columns for execution.

6 Claims, 4 Drawing Sheets

| FirstName | MiddleName | LastName | BirthDay | FirstLastHash | MiddleLastHash | BirthHash |
|---|---|---|---|---|---|---|
| John | Michael | Adams | 01.01.70 | 18DJD987 | LI91H09A | DU102 |
| Abby | Sara | Avery | 11.25.71 | YU09JDEQ | 7GVD856X | 7W3VB |
| ⋮ | ⋮ | ⋮ | ⋮ | ⋮ | ⋮ | ⋮ |

216

Find all data in TABLE with the following criterion:
First Name: John
Middle Name: Michael
Last Name: Adams 226
```
select *
from TABLE
where
  FirstLastHash = 18DJD987 and
  MiddleLastHash = LI19H09A
```

228
```
select *
from TABLE
where
  FirstName = John and
  MiddleLastHash = LI19H09A
```

230
```
select *
from TABLE
where
  FirstLastHash = 18DJD987 and
  MiddleName = Michael
```

232
```
select *
from TABLE
where
  FirstName = John,
  MiddleName = Micheal
  LastName = Adams
```

234
1. Query 226
2. Query 228
3. Query 230
4. Query 232

FIG. 2

HANDLING REQUESTS FOR DATA STORED IN DATABASE TABLES

BACKGROUND

Sometimes a database table can be queried using more than one combination of column(s) to retrieve requested data stored in the database table. In other words, more than one query can be used to satisfy a given request. When there is more than one possible query, applications will typically use the same query regardless of the situation. The same query, however, may not be the best query for every situation. Hence, using the same query for every situation can lead to suboptimal application performance.

SUMMARY

A method for handling requests for data stored in database tables is provided. In one implementation, a request for data stored in a database table is received. The database table includes non-hash and hash columns. A hash column includes hash values computed based on non-hash values in at least one non-hash column. Database queries that are executable to retrieve data stored in the database table that satisfy the request are generated. Each database query uses a different combination of columns in the database table. The database queries are ranked based on desirability. A database query using a higher number of hash columns is more desirable than a database query using a lower number of hash columns. A determination is then made as to whether any of the database queries only uses indexed columns. When one or more of the database queries only uses indexed columns, a highest ranked of the one or more database queries that only uses indexed columns is selected for execution.

DESCRIPTION OF DRAWINGS

FIG. 2 illustrates examples of a database table, a request for data stored in the database table, and database queries that are utilizable to satisfy the request for data stored in the database table.

DETAILED DESCRIPTION

This disclosure generally relates to handling requests for data stored in database tables. The following description is provided in the context of a patent application and its requirements. Accordingly, this disclosure is not intended to be limited to the implementations shown, but is to be accorded the widest scope consistent with the principles and features described herein.

Database tables sometimes have schemas that store data in different formats. Different formats of the same data are usually stored in different columns of a database tables. To give an example, a database table may include a 'First Name' column, a 'Last Name' column, and a 'First-Last Hash' column that includes hash values computed based on values in the 'First Name' and 'Last Name' columns.

When a database table has such a schema, multiple queries may be executable to retrieve data stored in the database table that satisfy a given request. For instance, if a request for data having a first name 'John' and a last name 'Smith' is received for the database table in the example above, then there are two possible database queries that can be executed to retrieve data stored in the database table that satisfy the request. One database query only uses the 'First-Last Hash' column of the database table. The other database query uses the 'First Name' column and the 'Last Name' column of the database table.

Although there may be more than one possible query that can be executed to retrieve data satisfying a request, applications typically rely upon only one query and leave it to a database management system (DBMS) to optimize execution of the one query through selection of an execution plan. One query, however, may not be optimal for every situation, which can negatively affect performance of applications. To give an example, if an application selects a query for execution that does not use any columns that are indexed when another query that uses indexed columns can be selected for execution, then performance of the application will be less than optimal.

Figure 1:
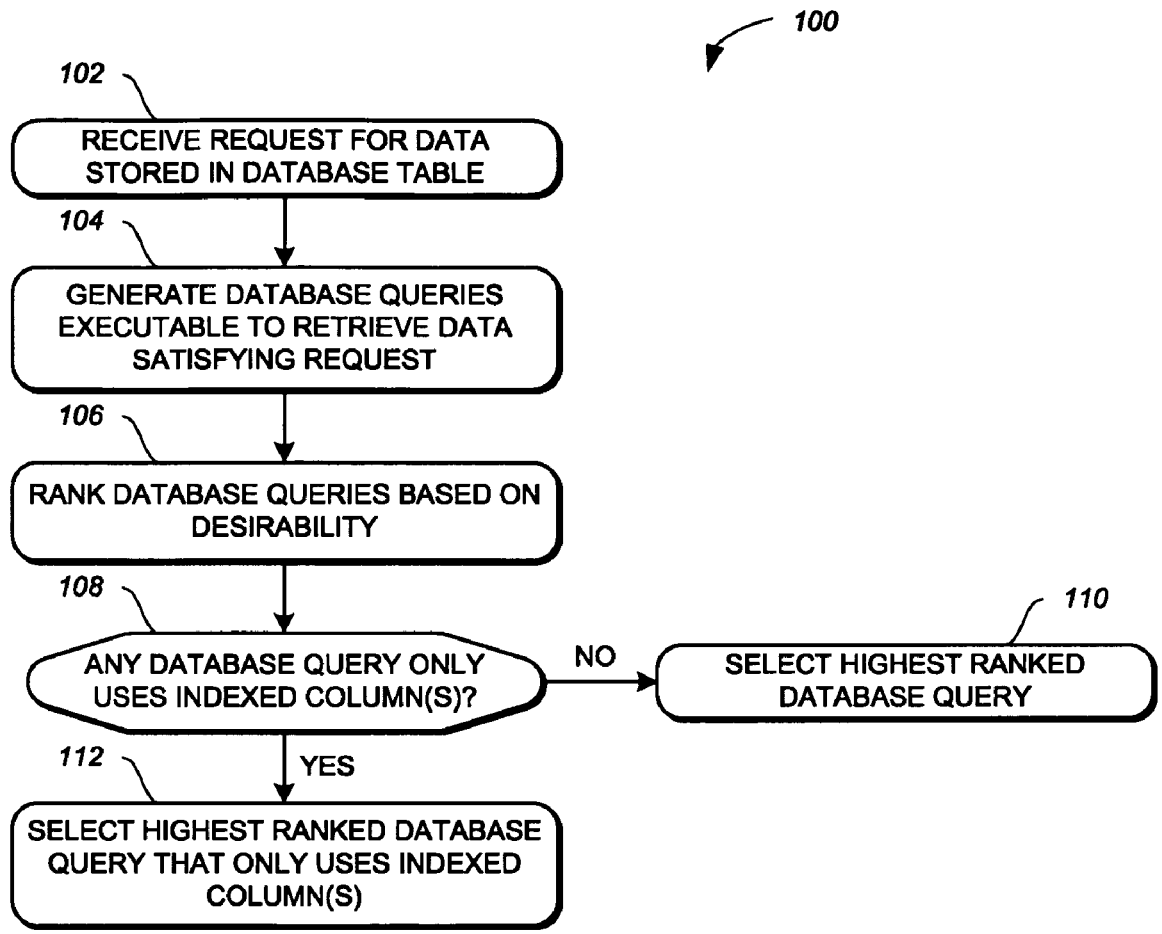
FIG. 1 depicts a method for handling requests for data stored in database tables according to an implementation.

Depicted in FIG. 1 is a method 100 for handling requests for data stored in database tables according to an implementation. At 102, a request for data stored in a database table is received. The database table includes non-hash and hash columns. For example, the database table may include one hash column and one non-hash column, two non-hash columns and one hash column, or the like. The number of non-hash columns need not be the same as the number of hash columns. A hash column includes hash values computed based on non-hash values in at least one non-hash column.

To give an example, FIG. 2 illustrates a sample database table 200 storing data on individuals. Sample database table 200 includes non-hash columns 202, 204, 206, and 208—'FirstName', 'MiddleName', 'LastName', and 'BirthDay', respectively. Sample database table 200 also includes hash columns 210, 212, and 214—'FirstLastHash', 'MiddleLastHash', and 'BirthHash', respectively. 'FirstLastHash' column 210 includes hash values computed based on non-hash values in 'FirstName' column 202 and 'LastName' column 206. 'MiddleLastHash' column 212 includes hash values computed based on non-hash values in 'MiddleName' column 204 and 'LastName' column 206. 'BirthHash' column 214 includes hash values computed based on non-hash values in 'BirthDay' column 208.

FIG. 2 also illustrates a sample request 216 for data stored in sample database table 200 that satisfies a criterion 218. Criterion 218 specifies a non-hash value 220 for column 202, a non-hash value 222 for column 204, and a non-hash value 224 for column 206. Each non-hash value specified in a criterion need not be for a different column of a database table. Criterions of other requests may include more or less non-hash values.

Referring back to FIG. 1, database queries that are executable to retrieve data stored in the database table that satisfy the request are generated at 104. Each database query uses a different combination of columns in the database table. A combination of columns used by a database query can be a single column in a database table.

With respect to sample request 216 in FIG. 2, there are four possible queries 226-232 that can be executed to retrieve data stored in database table 200 satisfying sample request 216. Query 226 involves hash columns 210 and 212. Query 228 involves non-hash column 202 and hash column 212. Query 230 involves non-hash column 204 and hash column 210. Query 232 involves non-hash columns 202, 204, and 206.

Although queries 226-232 are in Structured Query Language (SQL), other database query languages can be used instead.

At 106 in FIG. 1, the database queries are ranked based on desirability. In one implementation, a database query using a higher number of hash columns in the database table is more desirable than a database query using a lower number of hash columns in the database table. In other implementations, desirability may be based on something else (e.g., a total number of columns used).

Illustrated in FIG. 2 is a ranking 234 for queries 226-232. Query 226 is ranked highest because query 226 uses a highest number of hash columns. Query 232 is ranked lowest because query 232 does not use any hash column. Whether query 228 is ranked higher or lower than query 230 does not really matter as both queries 228 and 230 use a same number of hash columns. However, for convenience, query 228 is ranked higher in ranking 234 than query 230. In other implementations, rankings of queries involving a same number of hash columns may be based on, for instance, order of generation or something else.

A determination is made at 108 in FIG. 1 as to whether any of the database queries only uses indexed columns, which can provide a performance advantage during query execution. If none of the database queries only uses column or columns of the database table that are indexed, then the highest ranked database query is selected for execution at 110. For the example in FIG. 2, query 228 would be selected for execution to retrieve data from sample database table 200 that satisfies sample request 216.

In another implementation, when none of the database queries only uses indexed columns, an error message is outputted (e.g., on a screen). The error message may be in addition to or a substitute for selecting the highest ranked database query. In a further implementation, if none of the database queries only uses column or columns of the database table that are indexed, then the database query using a highest number of indexed columns is selected for execution. When there are multiple database queries using the highest number of indexed columns, a highest ranked of the multiple database queries is selected for execution.

On the other hand, if one or more of the database queries only uses indexed columns, then a highest ranked of the one or more database queries is selected for execution at 112 to retrieve data stored in the database table that satisfies the request. With respect to queries 226-232 in FIG. 2, if both hash columns 210 and 212 are indexed, then query 226 will be selected for execution. However, if only columns 202-206 are indexed, then query 232 will be selected for execution, even though it is ranked as least desirable.

Figure 3:
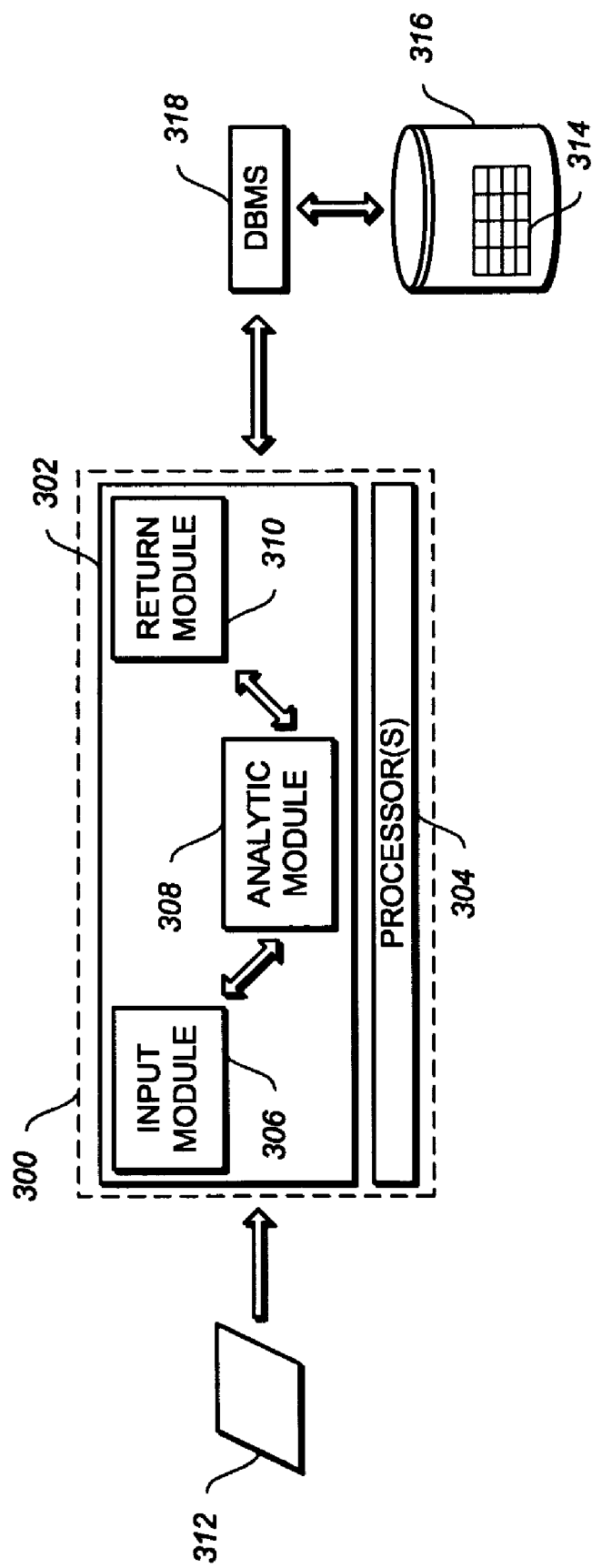
FIG. 3 shows a system for handling requests for data stored in database tables according to an implementation.

Shown in FIG. 3 is a system 300 for handling requests for data stored in database tables according to an implementation. System 300 includes an application 302 executing on one or more processors 304. Application 302 includes an input module 306, an analytic module 308, and a return module 310. Although not shown in FIG. 3, system 300 may include other components (e.g., memory, storage, and so forth). In addition, some or all of modules 306-310 may be combined. Alternatively, the functionalities of any of modules 306-310 may be split into multiple modules (not shown).

Input module 306 receives a request 312 for data stored in a database table 314. Database table 314 is stored in a database 316 that is managed by a database management system (DBMS) 318. Request 312 may be received via the Internet (e.g., HTTP), a workstation (e.g., inputted by a user), a file, a queue, a database, or the like. In addition, request 312 may be requesting data from other database tables (not shown) stored in database 316 or other databases (not shown) managed by database management system 318.

Analytic module 308 generates database queries executable to retrieve data stored in database table 314 that satisfy request 312. Each database query involves a different column or a different combination of columns in database table 314. The database queries generated by analytic module 308 are then ranked based on desirability (e.g., a number of hash columns used) and analyzed to determine whether any of the database queries only uses column or columns of database table 314 that are indexed. To determine whether a column of database table 314 is indexed, analytic module 308 can send an inquiry to database management system 318.

If one or more of the database queries generated by analytic module 308 only use column or columns of database table 314 that are indexed, then a highest ranked of those one or more database queries will be selected by analytic module 308 for execution by database management system 320 to retrieve data from database table 314 satisfying request 312. Return module 310 will return data retrieved from execution of the selected database query (e.g., display retrieve data on a display screen).

On the other hand, if none of the generated database queries only uses column or columns of database table 314 that are indexed, then analytic module 308 will select a highest ranked of the generated database queries and send the selected database query to database management system 320 for execution. Data retrieved from execution of the selected database query will be returned by return module 310.

In one implementation, rather than select the highest ranked database query generated by analytic module 308 when no query only uses indexed column(s) of database table 314, analytic module 308 instead selects a database query using a highest number of indexed column(s). If multiple database queries are using the highest number of indexed column(s), then a highest ranked among those database queries can be selected.

By taking into consideration all possible queries that can be executed to retrieve requested data from a database table, comparing those queries based on use of hash columns in the database table, and analyzing those queries based on indexes configured for the database table, a best possible query can be selected for execution. Since the best possible query is selected based on a particular set of circumstances, optimal performance should be achievable as query selection can change along with changes in circumstances (e.g., additional indexes being created for a database table).

This disclosure can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 4:
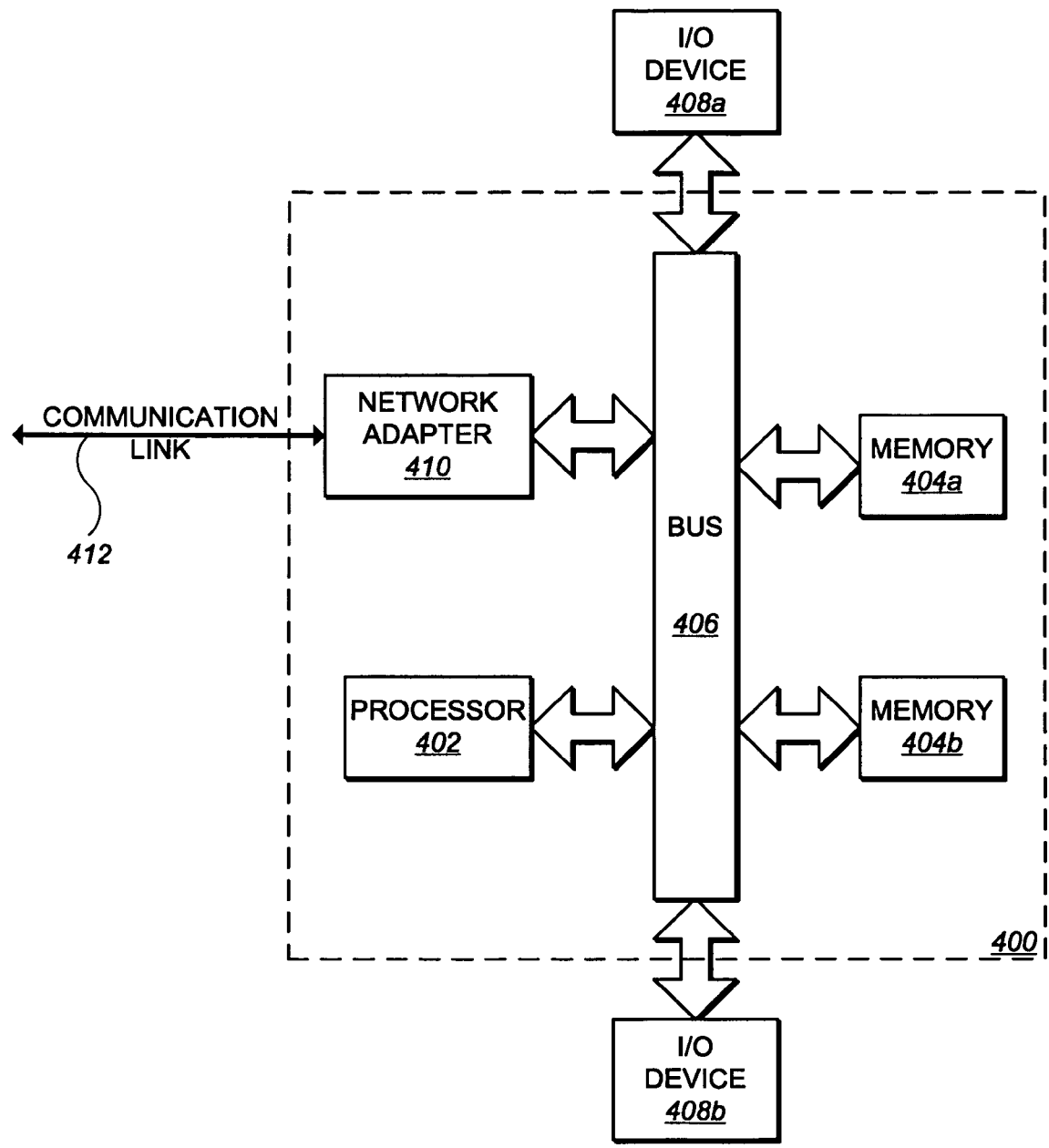
FIG. 4 is a block diagram of a data processing system with which implementations of this disclosure can be implemented.

FIG. 4 depicts a data processing system 400 suitable for storing and/or executing program code. Data processing system 400 includes a processor 402 coupled to memory elements 404a-b through a system bus 406. In other implementations, data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to data processing system 400. I/O devices 408a-b may be coupled to data processing system 400 directly or indirectly through intervening I/O controllers (not shown).

In the implementation, a network adapter 410 is coupled to data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

While various implementations for handling requests for data stored in database tables have been described, the technical scope of this disclosure is not limited thereto. For example, this disclosure is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of this disclosure.

The invention claimed is:

1. A method for handling requests for data stored in database tables, the method comprising:
   receiving a request for data stored in a database table, the database table including non-hash and hash columns, a hash column including hash values computed based on non-hash values in at least one non-hash column;
   generating a plurality of database queries that are executable to retrieve data stored in the database table satisfying the request, each database query using a different combination of columns in the database table, wherein each database query has already been optimized by a database management system through selection of an execution plan;
   ranking database queries based on desirability, a database query using a higher number of hash columns being more desirable than a database query using a lower number of hash columns;
   analyzing the database queries to determine whether any of the database queries only uses indexed columns of the database table; and
   responsive to one or more of the database queries only using indexed columns of the database table, selecting a highest ranked of the one or more database queries for execution.

2. The method of claim 1, wherein responsive to none of the database queries only using indexed columns, the method further comprises:
   executing a highest ranked of the database queries.

3. The method of claim 1, wherein responsive to none of the database queries only using indexed columns, the method further comprises:
   outputting an error message.

4. The method of claim 1, further comprising:
   returning data retrieved from execution of the selected database query.

5. The method of claim 1, wherein the plurality of queries is analyzed in ranking order.

6. A computer-readable medium containing program instructions for handling requests for data stored in database tables, wherein execution of program instructions by one or more processors of a computer system causes the one or more processors to carry out the steps of:
   receiving a request for data stored in a database table, the database table including non-hash and hash columns, a hash column including hash values computed based on non-hash values in at least one non-hash column;
   generating a plurality of database queries that are executable to retrieve data stored in the database table satisfying the request, each database query using a different combination of columns in the database table, wherein each database query has already been optimized by a database management system through selection of an execution plan;
   ranking database queries based on desirability, a database query using a higher number of hash columns being more desirable than a database query using a lower number of hash columns;
   analyzing the database queries to determine whether any of the database queries only uses indexed columns of the database table; and
   responsive to one or more of the database queries only using indexed columns of the database table, selecting a highest ranked of the one or more database queries for execution.

* * * * *